Patented Jan. 9, 1951

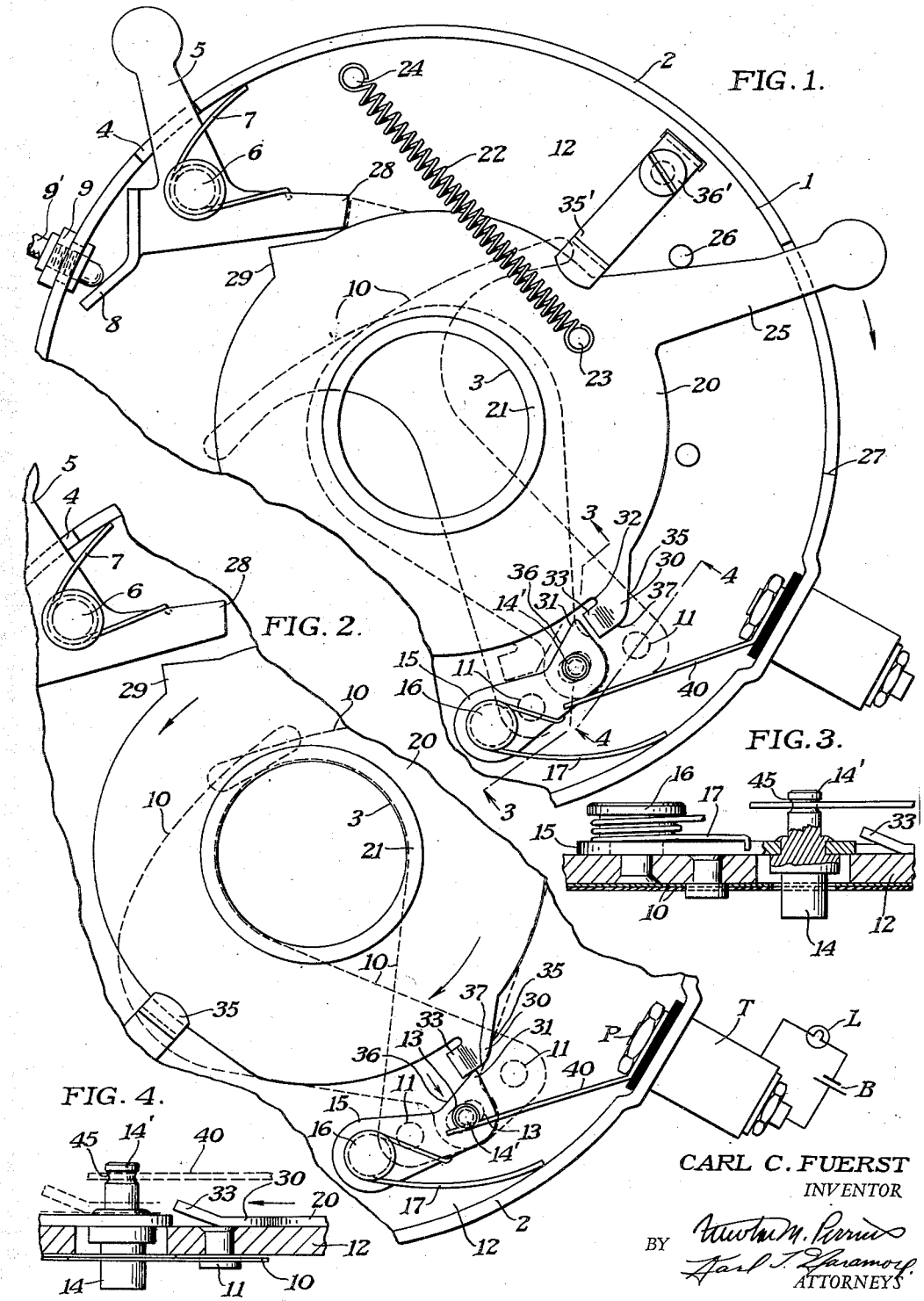

2,537,888

UNITED STATES PATENT OFFICE 2,537,888

TWO-BLADE SHUTTER HAVING BUILT-IN FLASH SYNCHRONIZING SWITCH

Carl C. Fuerst, Rochester, N. Y., assignor to Eastman Kodak Company, Rochester, N. Y., a corporation of New Jersey Application December 3, 1947, Serial No. 789,534

1 Claim. (Cl. 95—11.5)

The present invention relates to flash synchronizers, and particularly to a flash synchronizer built into a photographic shutter of the between-the-lens type.

One object of the present invention is to provide a flash synchronizer which is built into a photographic shutter of the between-the-lens type and which synchronizer is particularly designed for use with a specific type of shutter mechanism, so that the combination of the two forms a very efficient flash shutter.

Another object is to provide a built-in flash synchronizer which requires a minimum number of parts, exclusive of the shutter mechanism per se, whereby the addition of the synchronizer to the shutter adds little to the cost of the shutter.

Another object is to provide a flash shutter wherein the shutter comprises a plurality of shutter blades whose movement is controlled by a driving pin and which driving pin constitutes one of a pair of switch contacts controlling the flash circuit.

The novel features that I consider characteristic of my invention are set forth with particularity in the appended claim. The invention itself, however, both as to its organization and its methods of operation, together with additional objects and advantages thereof, will best be understood from the following description when read in connection with the accompanying drawings, in which Fig. 1 is a partial plan view of a photographic shutter with the cover removed and showing a flash synchronizer constructed in accordance with a prefered embodiment of the present invention. In this figure the shutter parts are shown in their released, or untensioned, positions;

Fig. 2 is a partial plan view, similar to Fig. 1, but showing the parts in the position they assume during the release of the shutter, and with the shutter blades full open and just before they close;

Fig. 3 is a sectional detail taken sbustantially on line 3—3 of Fig. 1; and

Fig. 4 is a sectional detail taken substantially on line 4—4 of Fig. 1.

Like reference characters refer to corresponding parts throughout the drawings.

The present invention relates to the combination of a flash synchronizer with a particular type of between-the-lens shutter shown wherein the movement of the shutter blades is controlled by a driving pin between an operative position, wherein the blades are open, and an inoperative position, wherein the blades are closed. The driving pin is normally spring-pressed to its inoperative position and moved to its operative position and then released by a cam on a spring-driven master ring during its movement from a cocked position. The driving pin for the blades constitutes one contact of a flash switch in the shutter so that synchronization can be efficiently obtained with little difficulty and little added cost.

The shutter blade mechanism disclosed is not broadly new per se, a similar one being disclosed in my copending U. S. patent application Ser. No. 712,349, filed November 26, 1946, now Patent No. 2,475,952 issued July 12, 1949, but the combination of the shutter blade mechanism with a flash synchronizer is new and is the subject of the present invention.

As indicated in Fig. 1, the present flash shutter may consist of a casing 1 having an upstanding flange 2 around the periphery and an exposure aperture 3 in the center of the casing. The flange 2 is slotted at 4 so that a shutter trigger 5 may project through the flange and may move from the latching position shown in Fig. 1 to the released position shown in Fig. 2. The trigger 5 is pivoted on a stud 6 and a spring 7 normally holds the trigger in its latching position, as shown in Fig. 1. The trigger also may include a projection 8 disposed in alignment with the cable release bush 9 in the flange 2 so that the trigger may be operated through a cable release shown in part at 9', rather than by a manual operation of the trigger 5.

This shutter includes a pair of like shutter blades 10, each pivoted at one end and to one side of the exposure aperture 3 on separate pins 11 extending downwardly from the mechanism plate 12. Overlapping portions of each of the shutter blades are provided with elongated slots 13 disposed intermediately pivot points 11 of the blades and the blades are caused to open and close the exposure aperture by movement of a driving pin 14, engaging the slots 13, substantially radially of the casing and between an inoperative position shown in Fig. 1 and an operative position shown in Fig. 2. When the driving pin 14 is in its inoperative position (see Fig. 1), or nearest the center of the casing, the shutter blades are closed by virtue of the pin-and-slot connection. On the other hand, when the driving pin 14 is moved in the direction indicated by the arrow in Fig. 2 to its operative position (see Fig. 2), the blades are moved to their full-open position.

In my above-noted copending patent application I have shown the equivalent of the driving pin 14 as being carried by one blade and passing through a slot in the other. While this arrangement is operative, I have found that some difficulty is encountered because of the thin gauge of the shutter blades to which the pin is fastened and a cocking of the pin occasioned by driving it in its two directions to separate the blades. Accordingly, in the present embodiment I mount the driving pin 14 on a lever 15 pivoted to a stud 16 fixed to and extending above the mechanism plate 12. A spring 17 wrapped around the stud 16, and anchored at one end against the flange 2 and at the other end to the edge of the lever, normally moves the lever in a counterclockwise direction. Thus, this spring normally acts to move the driving pin 14 to its inoperative position (see Fig. 1) wherein it closes the shutter blades.

The opening and closing movements of the shutter blades are controlled by a ring-shaped master member 20; this member turning about an upwardly extending flange 21 on the mechanism plate 12 in encircling relation with the exposure aperture 3, as clearly set forth in my above-noted patent application. A spring 22 attached at one end to a pin 23 carried by the master member and at the other end to a stud 24 carried by the mechanism plate normally holds the ring 20 in its released or rest position shown in Fig. 1 with one side of the setting arm 25 thereon engaging a pin 26 fixed in the mechanism plate 12. The master ring 20 is cocked by moving it in a clockwise direction by the use of the setting arm 25 extending through a slot 27 in the flange 2 against the action of spring 22 until the end 28 of the trigger 5 drops in front of the latch member 29 extending from the periphery of the ring 20, as shown by the dotted line position of latch member 29 in Fig. 1.

When the master ring 20 is moved to its cocked position, the blade-operating cam 30 extending from the periphery thereof assumes the dotted line position shown in Fig. 1. To permit this cam to pass over the end 31 of the lever 15 during the cocking operation of the shutter without causing said lever to be pivoted, the body of the cam is cut back, as indicated at 32, and the end of the cam is turned up, as clearly shown at 33 in Figs. 3 and 4. Thus, as the master ring is moved clockwise to its cocked position, the turned-up end 33 of the cam rides up over the lever and drops down on the other side thereof. This necessitates the master ring 20 tilting slightly and this movement is permitted because of a pair of oppositely disposed spring clips 35'; each being attached to the mechanism plate 12 by means of a stud 36'. Both of these clips are resilient and, while they tend to hold the master ring 20 flat in a plane upon the mechanism plate, nevertheless they allow the ring to move from this plane in a more or less axial direction so that the ring may rock from its plane when the cam 30 passes over the end 31 of lever 15 during cocking of the shutter.

The blade-operating cam 30 has an inclined cam surface 35 which is adapted to engage a corresponding inclined surface 36 on the end 31 of lever 15 when the master ring is moving counterclockwise under the action of spring 22 to pivot the lever and the blade-operating pin 14 thereon in a direction to open the shutter blades. This cam surface 35 has a rise sufficient to cause the blades to be fully opened. During continued movement of the ring, the end 31 of lever 15 rides onto a cam surface 37 contiguous with cam surface 35 and which is concentric with the exposure aperture. While the end 31 of lever 15 is in engagement with this cam surface, the blades are held in their full-open position, as shown in Fig. 2, and thereafter the cam moves out from under the lever and the lever drops back to its normal position under the action of spring 17, whereupon the shutter blades are closed. It will thus be seen that as the master ring 20 is moving from its cocked position under the action of driving spring 22, the blade-operating cam 30 moves the pin 14 against the action of its spring causing the shutter blades to open; holds them open for a short time and then permits them to close to make the exposure.

Coming now to the flash synchronizer of the present invention, it is one which is adapted to accommodate that type of conventional flash lamp having a "lag" of approximately five milliseconds, or lamps of the gaseous discharge type which have no "lag," but not flash lamps having the longer "lags" of twenty milliseconds. These two types of flash lamps, first mentioned, have "lag" characteristics which allow them to be synchronized with the shutter by closing the lamp circuit at substantially the instant the shutter reaches is full-open position.

According to the present invention, the flash lamp circuit is controlled by a pair of switch contacts, one of which is the shutter blade driving pin 14, or, in reality, an extension thereof, while the other is a spring contact 40 disposed in the path of movement of the driving pin to be engaged thereby at substantially the instant the shutter blades reach their full-open position. Fixed to the flange 2 of the shutter is a conventional electric terminal T onto which a known type of electrical jack, not shown, is adapted to be slipped to connect one side of a circuit including a flash lamp L and source of current B to the shutter contacts in the shutter. The shell of the terminal T is grounded to the shutter casing so as to connect one side of the circuit to the shutter driving pin through the shutter mechanism. The insulated center post of the terminal T extends into the shutter casing and is equipped with a binding post P to which the spring contact 40 is directly connected.

As clearly shown in Figs. 3 and 4, the driving pin 14 has an extension 14' which extends upwardly from the lever 15 and constitutes the movable switch contact. This extension 14' is grooved, as shown at 45, to seat the spring contact 40 when engaged thereby and thus prevent the contact 40 from moving axially of extension 14' and slipping over the top thereof. It will be readily understood that by bending contact 40 at a point adjacent the binding post P, the end of the contact can be disposed relative to the driving pin 14 and its extension 14', so as to be engaged thereby in proper timed relation to the opening of the shutter blades to secure synchronization.

From the above description it will be readily understood that the present combination of shutter and built-in flash synchronizer is achieved by the addition of a minimum number of parts to the shutter per se. In fact, all that is required is the terminal T, the contact 40, and an extension 14' on the shutter-driving pin. The combination makes possible easy initial adjustment and continued efficient operation because it involves no movable parts separate from the shutter blade operating mechanism wherein lost motion may be involved, and contains no long electrical lead wires which require insulation. Furthermore, the switch being operated by the blade mechanism, its time of closing is independent of any manual control so that synchronization does not depend upon the speed at which the trigger is operated. In addition, the switch arrangement is such that the spring action thereof does not oppose or slow up the speed of operation of the master ring which controls the operation of the shutter blades.

Although I have shown and described certain specific arrangements of my invention, I am aware that many modifications thereof are possible. My invention therefore is not intended to be limited to the specific details of construction shown and described but is intended to cover all modifications coming within the scope of the appended claim.

Having thus described my invention, what I claim as new and desire to secure by Letters Patent of the United States is:

In a photographic shutter having a built-in flash synchronizer the combination of a circular casing provided with an exposure aperture; a pair of shutter blades pivoted in spaced relation on the same side of said aperture for opening and closing said aperture, and having overlapping portions each provided with an elongated slot disposed eccentrically of and intermediate the pivot points of said blades so that said slots lie one above the other; means for moving said blades between an open and a closed position relative to said aperture, and including a driving pin extending through said elongated slots and mounted to move between a normal inoperative position, wherein it closes said blades, and an operative position, wherein it opens said blades; means for moving said driving pin between its two positions, including a spring-driven member movable between a cocked position and a released position, a cam on said driven member adapted to move said driving pin to its operative position and allow it to again return to its inoperative position when said driven member moves from its cocked position; a flash synchronizer circuit including a pair of switch contacts, one of said contacts being said driving pin, and the other contact being a stationary flexible member disposed in said casing in the path of movement of said driving pin to be engaged by said pin substantially at the instant when said pin reaches its operative position.

CARL C. FUERST.

REFERENCES CITED

The following references are of record in the file of this patent:

UNITED STATES PATENTS

| Number | Name | Date |
| --- | --- | --- |
| 2,129,561 | Brueck | Sept. 6, 1938 |
| 2,145,917 | Boesser | Feb. 7, 1939 |
| 2,196,604 | Galter | Apr. 9, 1940 |
| 2,198,975 | Pollock | Apr. 30, 1940 |
| 2,282,850 | Brownscombe | May 12, 1942 |
| 2,290,362 | Springer | July 21, 1942 |
| 2,340,405 | Schwarz | Feb. 1, 1944 |
| 2,356,455 | Fuerst | Aug. 22, 1944 |